(12) United States Patent
Lee et al.

(10) Patent No.: US 7,888,518 B2
(45) Date of Patent: Feb. 15, 2011

(54) ORGANIC DYE FOR RECORDING LAYER AND HIGH DENSITY OPTICAL RECORDING MEDIUM USING THE SAME

(75) Inventors: Ming-Chia Lee, Taichung County (TW); Chien-Liang Huang, Taoyuan County (TW); Wen-Yih Liao, Taichung (TW); Ching-Yu Hsieh, Hsinchu County (TW); Tzuan-Ren Jeng, Hsinchu (TW); An-Tse Lee, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 127 days.

(21) Appl. No.: 12/475,725

(22) Filed: Jun. 1, 2009

(65) Prior Publication Data

US 2009/0238969 A1   Sep. 24, 2009

Related U.S. Application Data

(62) Division of application No. 11/323,144, filed on Dec. 29, 2005, now Pat. No. 7,566,524.

(51) Int. Cl.
*C07D 319/04* (2006.01)
*G11B 7/24* (2006.01)

(52) U.S. Cl. ............ 549/265; 549/274; 549/333; 428/64.8

(58) Field of Classification Search ............... 549/265, 549/274, 333; 428/64.8
See application file for complete search history.

*Primary Examiner*—Janet L. Andres
*Assistant Examiner*—Raymond Covington
(74) *Attorney, Agent, or Firm*—J.C. Patents

(57) ABSTRACT

A preparation method of a dye incorporated in a recording layer for a high density optical recording medium, having the following general chemical structural formula (I):

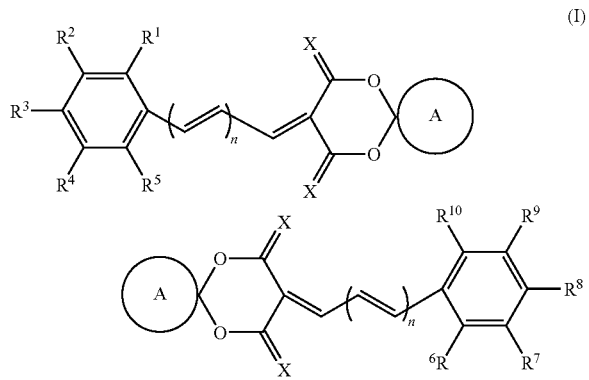

is provided.

3 Claims, 4 Drawing Sheets

ORGANIC DYE FOR RECORDING LAYER AND HIGH DENSITY OPTICAL RECORDING MEDIUM USING THE SAME

CROSS-REFERENCE TO RELATED APPLICATION

This application is a divisional application of, and claims priority of application Ser. No. 11/323,144 filed on Dec. 29, 2005, now pending, which claims the priority benefit of Taiwan application serial no. 94139057, filed on Nov. 8, 2005. The entirety of each of the above-mentioned patent applications is hereby incorporated by reference herein and made a part of this specification.

BACKGROUND OF THE INVENTION

1. Field of the Invention

The present invention generally relates to a high density optical recording medium. More particularly, the present invention relates to a high density optical recording medium employing short wavelength laser that makes high density storage and reproduction/playback of the high density information records possible.

2. Description of Related Art

In recent years, development of optical recording media employing laser have been remarkable. An example of the optical recording medium, such as an optical disc, is generally designed to irradiate a focused laser beam of about 1 μm to a thin recording layer formed on a disc shaped substrate to conduct information recording. The recording is implemented in a manner that upon absorption of the laser beam energy, the irradiated portion of the recording layer undergoes a thermal deformation such as decomposition, evaporation or melting. Reproduction of the recorded information is carried out by reading the difference in the reflectance between the portion having a deformation formed by the laser beam and the portion without such deformation.

Accordingly, an optical recording medium is required to efficiently absorb the energy of the laser beam, and is also required to have a predetermined amount of absorbed light to a laser beam having a specific wavelength employed for recording and to be high in the reflectance to laser beam having a specific wavelength employed for reproduction for accurately conducting the reproduction of information.

However, storage capacity of the optical recording medium employing the laser source is limited due to optical diffraction. At present, some principles and methods of enhancement of the storage density of the optical information storage media are being set forth, including such as shifting of the wavelength of the laser source, for example, from red laser to blue laser, or enhancement of the objective numerical aperture ("NA") of optical lens. Some other methods include improvement of the encoding methods of the digital signal, or a disc storage method using an extra-fine resolution near field optical structure, or a technology for increasing the storage capacity of the information storage media (e.g., a compact disc) by using stacked multiple recording layers, i.e., the recording layers of the information storage media is developed into a three dimensional space multilayer structure, to increase the storage capacity. All the methods described above may be employed to effectively increase the storage capacity of the optical recording medium.

In the method of the shifting to shorter wavelength laser source, a new generation of a high density disc storage specification (BLU-RAY™ Disc) is published in 2002 by companies such as Hitachi, LG, National, Pioneer, Philips, Samsung, Sharp, Sony and Thomson Multimedia in common. A single-side BLU-RAY™ Disc may be promoted up to 27 GB by employing a 405 nm blue laser source and a 0.1 mm optical transmission cover layer structure. Thus, optical recording medium employing a short wavelength laser source for reading and storage operations has become the main stream of the development of the high density optical recording media.

SUMMARY OF THE INVENTION

Accordingly, the present invention is directed to a high density optical recording medium employing short wavelength laser source with a wavelength no longer than 530 nm for recording high density information and reproduction/playback of the high density information recordings.

The present invention provides a dye for a recording layer suitable for an optical recording medium employing short wavelength laser source with a wavelength no longer than 530 nm for recording high density information and reproduction/playback of the high density information recordings.

According to an aspect of the present invention, the dye mentioned above shows absorption at wavelength within a range of 300 to 600 μm, and is excellent in the light fastness and thermal stability.

The dye of the present invention mentioned above has a following general chemical structural formula:

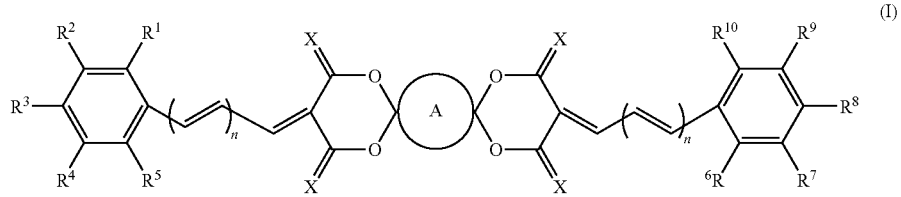

(I)

Wherein n is an integer of 0 or 1, X represents oxygen atom or $C(CN)_2$, A represents substituted or non-substituted cyclic alkyl group and $R_1$, $R_2$, $R_3$, $R_4$, $R_5$, $R_6$, $R_7$, $R_8$, $R_9$, $R_{10}$ represent hydrogen atom, halogen atom, alkyl group with carbon number 1-18 ($C_{1-18}$), alkoxy group with carbon number 1-18 ($C_{1-18}$), carboxyl group with carbon number 1-18 ($C_{1-18}$), amino group, substituted amino group, alkyl ester group with carbon number 1-18 ($C_{1-18}$), carboxyl group with carbon number 1-18 ($C_{1-18}$), benzene including amino group or carboxyl group, nitro group, adamantyl carbonyl group, adamantyl group, alkenyl group, alkynyl group, amino group, azo group, aryl group, aryloxy group, arylcarbonyl group, aryloxycarbonyl group, arylcarbonyloxy group, aryloxycarbonyloxy group, alkylcarbonyl group, alkylcarbonyloxy group, alkoxycarbonyloxy group, alkoxycarbonyl group, carbamoyl group, cyanate group, cyano group, formyl group, formyloxy group, heterocyclic group, isothiocyanate group, isocyano group, isocyanate group, nitroso group, perfluoroalkyl group, perfluoroalkoxy group, sulfinyl group, sulfonyl group, silyl group, thiocyanate group.

The dye of the present invention can be employed for, for example, a recording layer of an optical recording medium. Because the dye of the present invention shows absorption at a wavelength ranging from 300 nm to 600 nm, it is possible to fabricate a high density optical recording medium employing a short wavelength laser source with a wavelength no longer than 530 nm, preferably a laser source with a wavelength of 405 nm, for recording high density information and reproduction/playback of the high density information recordings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE INVENTION

Figure 1:
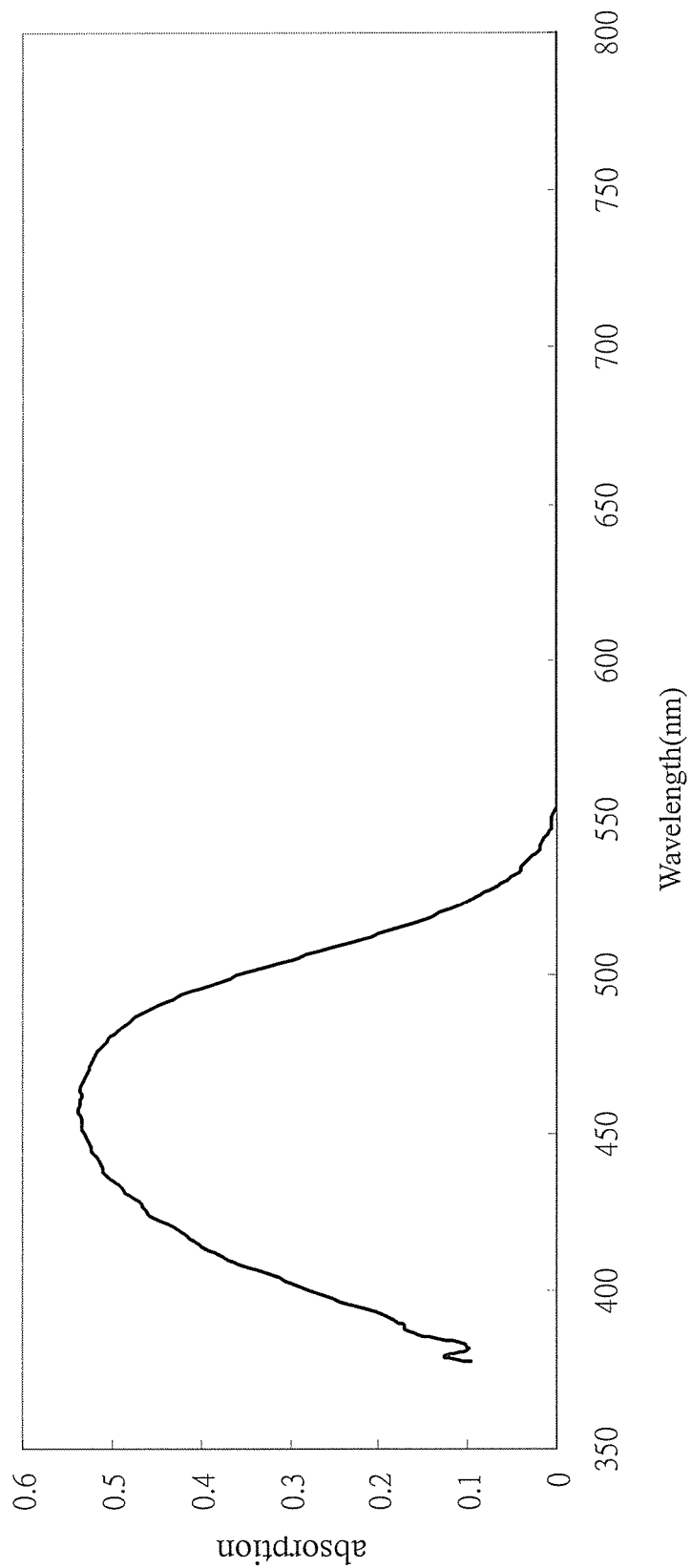
FIG. 1 illustrates an UV/Visible/IR absorption spectrum of the dye derivative (1) of the present invention.

It is to be understood that both the foregoing general description and the following detailed description are exemplary, and are intended to provide further explanation of the invention as claimed.

The present invention provides a dye suitable for a recording layer for fabricating a high density optical recording medium employing short wavelength laser source with a wavelength no longer than 530 nm for recording high density information and reproduction/playback of the high density information recordings. The dye has the following general chemical structural formula:

produce a high density optical medium by employing the recording layer incorporated with the dye of the present invention so that a short wavelength laser having a wavelength no longer than 530 nm, preferably a blue laser with a wavelength 405 nm, may be employed for recording high density information on the recording layer and reproduction/playback of the same.

According to an embodiment of the present invention, the dye (I) of the present invention may be synthesized by using the following starting materials.

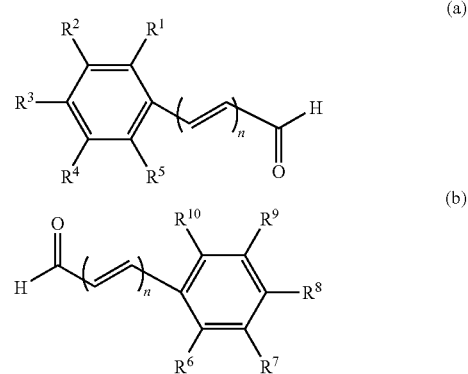

wherein n is an integer of 0 or 1, in starting materials (a) and (b), $R_1, R_2, R_3, R_4, R_5, R_6, R_7, R_8, R_9, R_{10}$ represent hydrogen atom, halogen atom, alkyl group with carbon number 1-18 ($C_{1-18}$), alkoxy group with carbon number 1-18 ($C_{1-18}$), carboxyl group with carbon number 1-18 ($C_{1-18}$), amino group, substituted amino group, alkyl ester group with carbon number 1-18 ($C_{1-18}$), carboxyl group with carbon number 1-18 ($C_{1-18}$), benzene including amino group or carboxyl group,

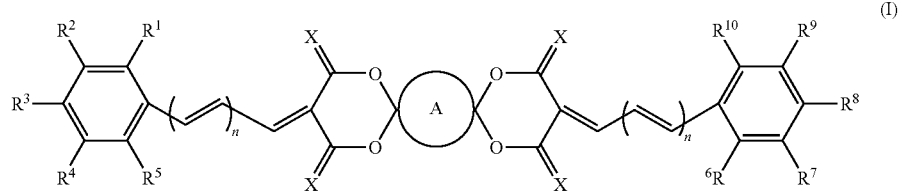

wherein n is an integer of 0 or 1, X represents oxygen atom or $C(CN)_2$, A represents substituted or non-substituted cyclic alkyl group and $R_1, R_2, R_3, R_4, R_5, R_6, R_7, R_8, R_9, R_{10}$ represent hydrogen atom, halogen atom, alkyl group with carbon number 1-18 ($C_{1-18}$), alkoxy group with carbon number 1-18 ($C_{1-18}$), carboxyl group with carbon number 1-18 ($C_{1-18}$), amino group, substituted amino group, alkyl ester group with carbon number 1-18 ($C_{1-18}$), carboxyl group with carbon number 1-18 ($C_{1-18}$), benzene including amino group or carboxyl group, nitro group, adamantyl carbonyl group, adamantyl group, alkenyl group, alkynyl group, amino group, azo group, aryl group, aryloxy group, arylcarbonyl group, aryloxycarbonyl group, arylcarbonyloxy group, aryloxycarbonyloxy group, alkylcarbonyl group, alkylcarbonyloxy group, alkoxycarbonyloxy group, alkoxycarbonyl group, carbamoyl group, cyanate group, cyano group, formyl group, formyloxy group, heterocyclic group, isothiocyanate group, isocyano group, isocyanate group, nitroso group, perfluoroalkyl group, perfluoroalkoxy group, sulfinyl group, sulfonyl group, silyl group, thiocyanate group.

The dye (I) of the present invention shows absorption in wavelength range of 300 to 600 nm and is excellent in the light fastness and thermal stability. Therefore, it is possible to nitro group, adamantyl carbonyl group, adamantyl group, alkenyl group, alkynyl group, amino group, azo group, aryl group, aryloxy group, arylcarbonyl group, aryloxycarbonyl group, arylcarbonyloxy group, aryloxycarbonyloxy group, alkylcarbonyl group, alkylcarbonyloxy group, alkoxycarbonyloxy group, alkoxycarbonyl group, carbamoyl group, cyanate group, cyano group, formyl group, formyloxy group, heterocyclic group, isothiocyanate group, isocyano group, isocyanate group, nitroso group, perfluoroalkyl group, perfluoroalkoxy group, sulfinyl group, sulfonyl group, silyl group, thiocyanate group.

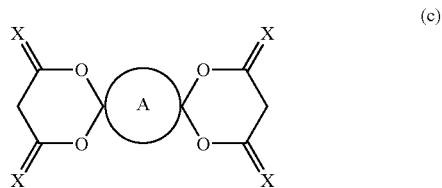

wherein in starting material (c), A represents substituted or non-substituted cyclic alkyl group, X represents oxygen atom or $C(CN)_2$.

The dye (I) of the present invention may be synthesized by the following chemical reaction.
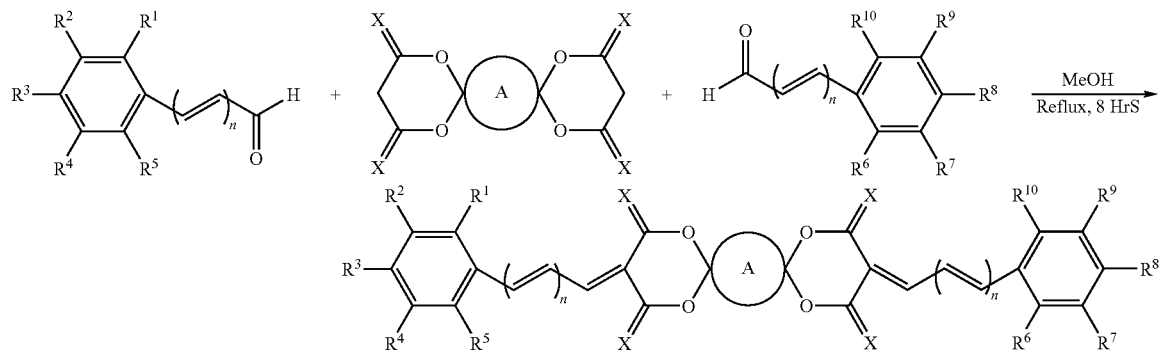
Following are some of the specific derivatives of the dye (I) of the present invention. However, the scope of the present invention is not limited to the listed examples hereafter.
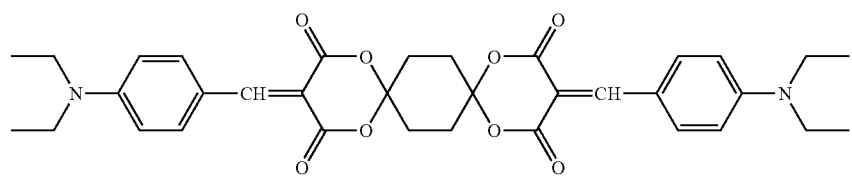
(1)
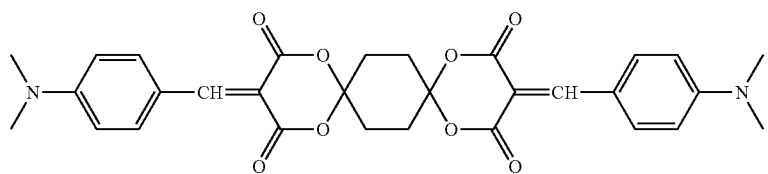
(2)
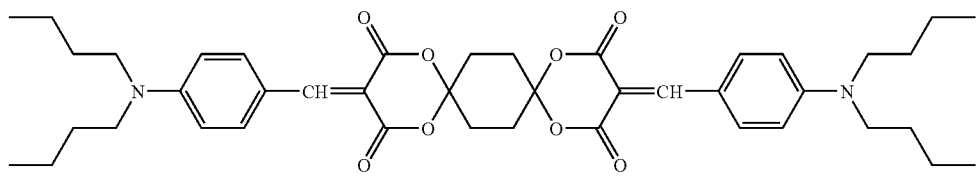
(3)
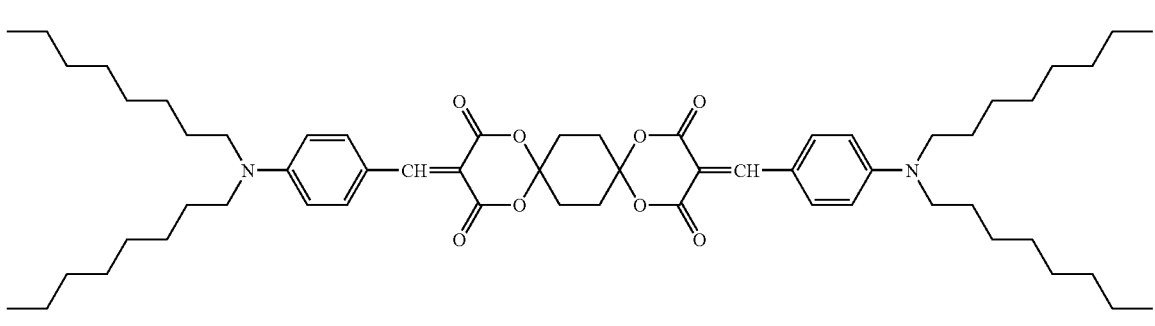
(4)
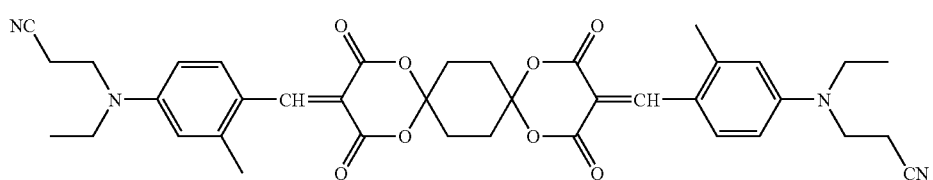
(5)

-continued
(6)
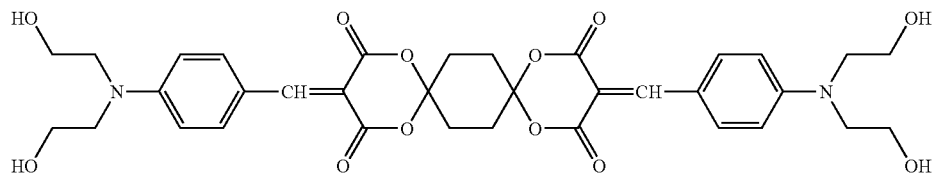
(7)
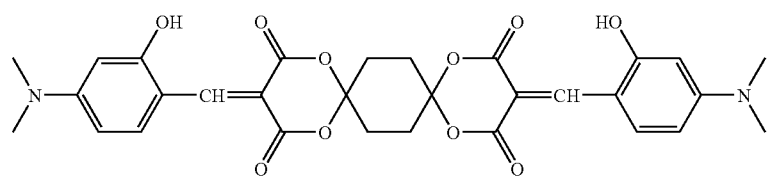
(8)
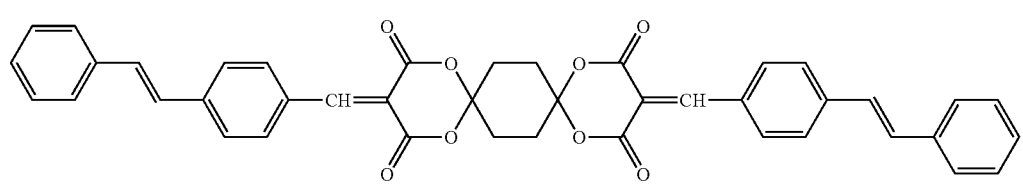
(9)
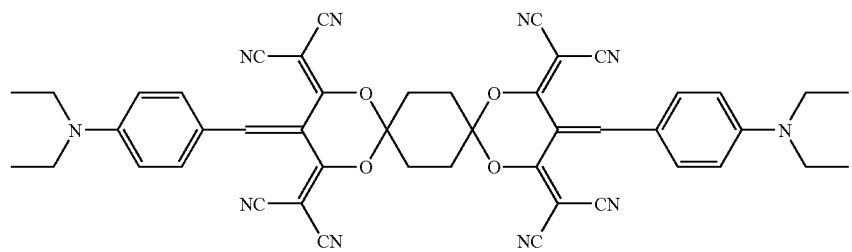
(10)
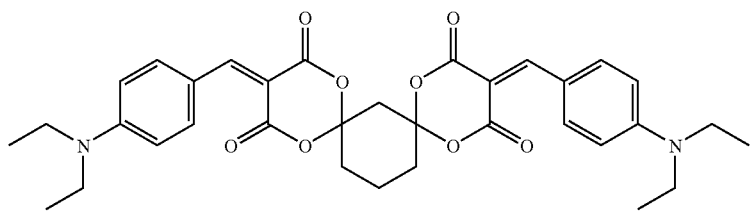
(11)
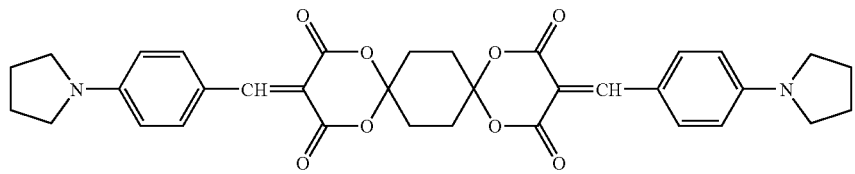
(12)
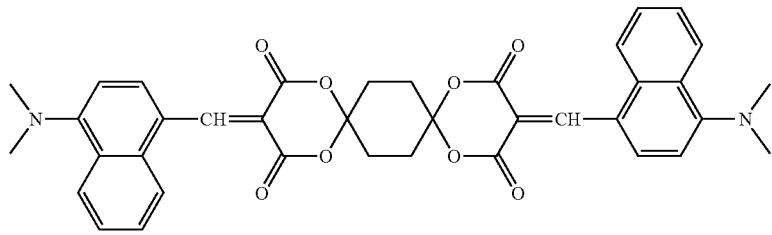

-continued
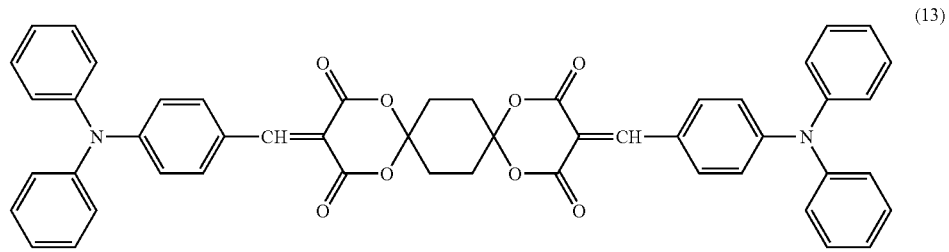
(13)
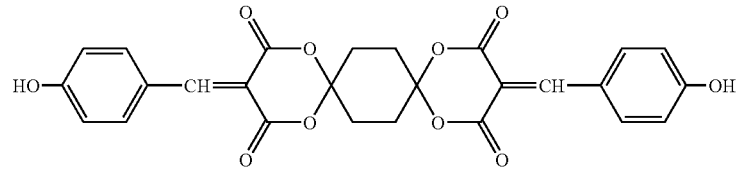
(14)
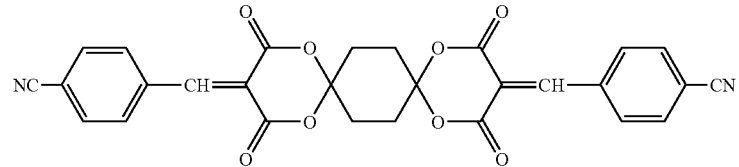
(15)
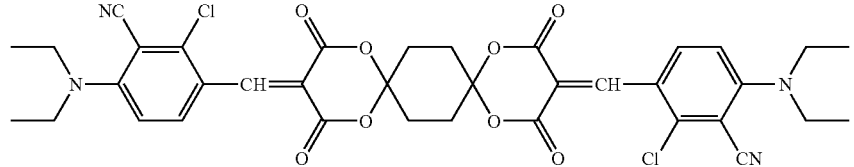
(16)
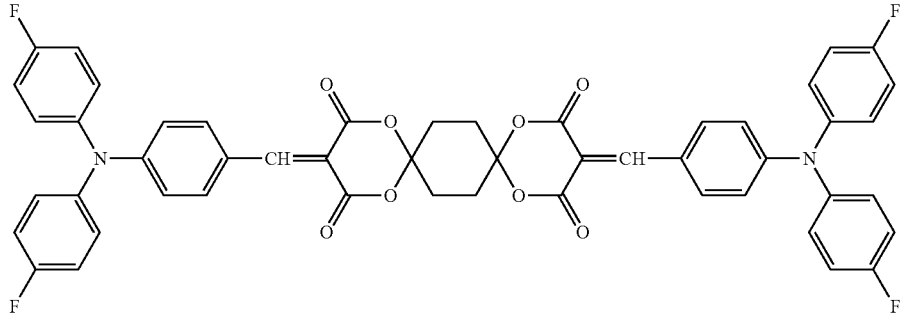
(17)
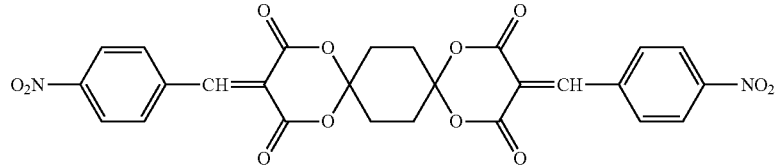
(18)
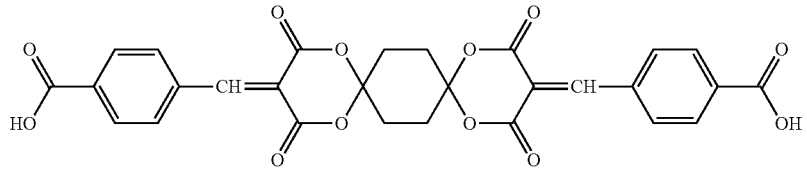
(19)

-continued
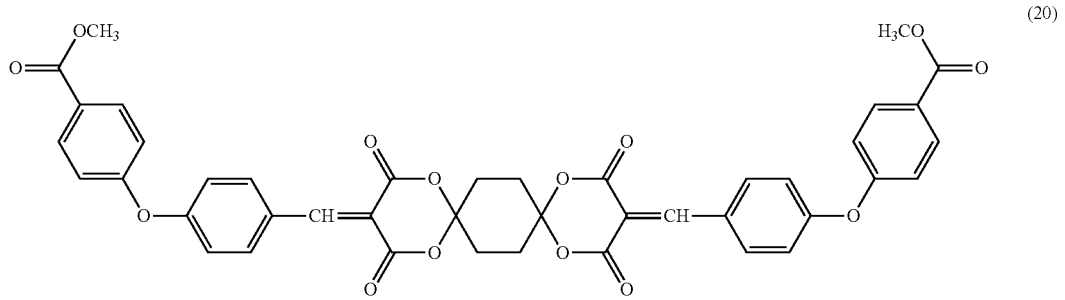
(20)
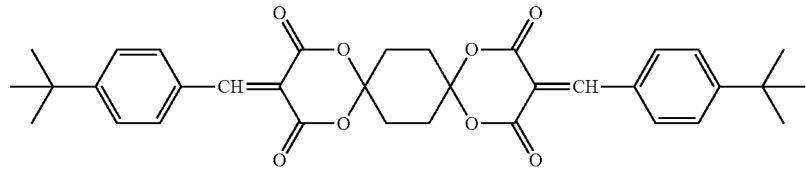
(21)
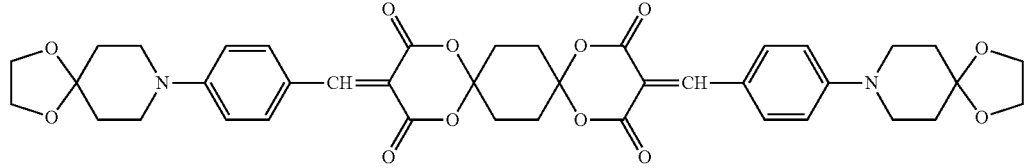
(22)
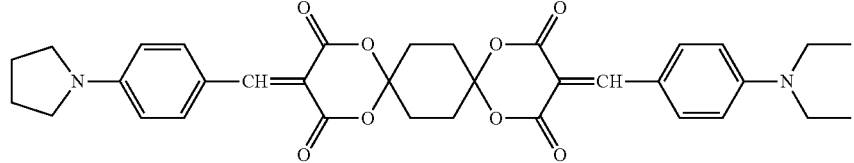
(23)
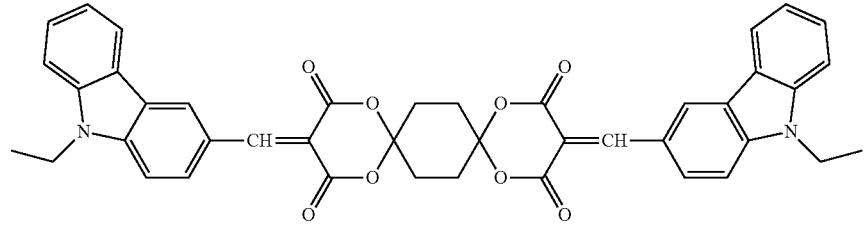
(24)
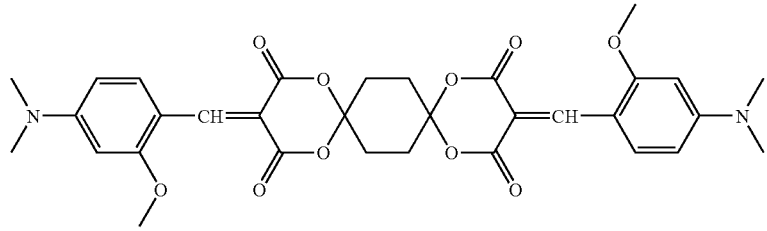
(25)
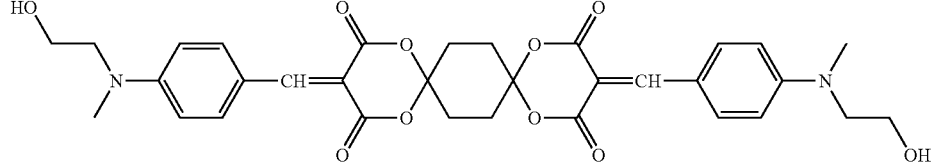
(26)

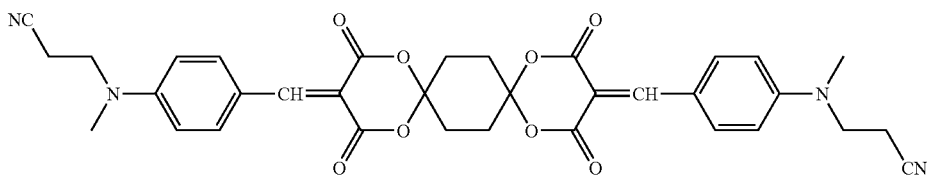
(27)

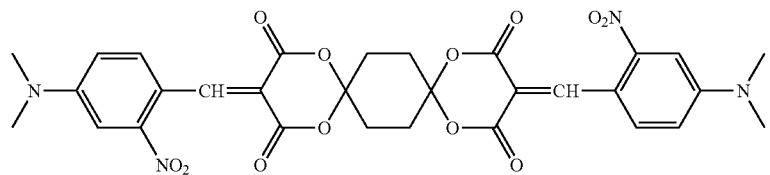
(28)

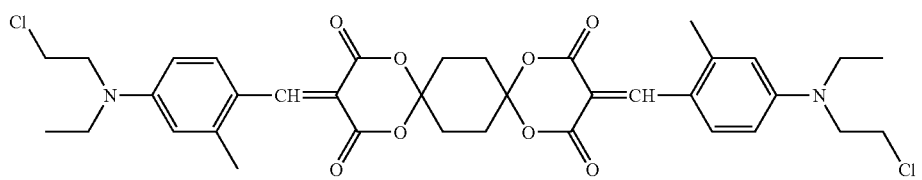
(29)

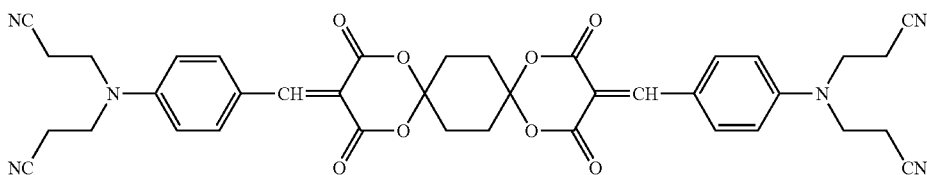
(30)

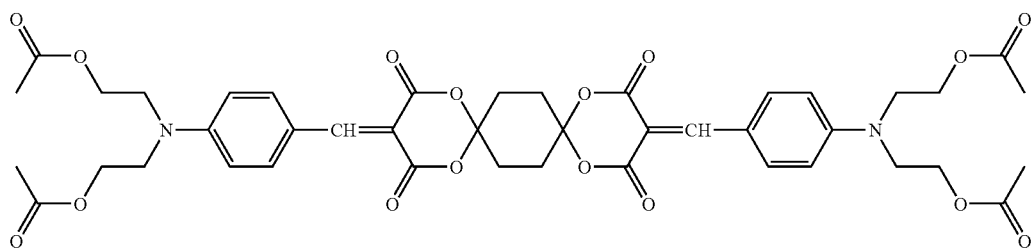
(31)

Hereinafter, the chemical synthesis of the specific dye derivatives (1), (2), (3) and (4) of the dye (I) of the present invention will be described.

Synthesis Example 1

0.02 mole of N,N-diethylaminolbenzaldehyde and 0.01 mole of starting material (c) (X is oxygen atom) were dissolved in 20 moles of methanol, and the resulting solution was refluxed for 8 hours. After the reaction was complete, the product was filtered and dried to obtain a bright orange colored solidified crystals. The yield was found to be about 80%. The chemical structure of this derivative is shown below.

A sample of the above dye derivative (1) was dissolved in ethanol solution and the resulting solution was used for measuring the absorbance in a spectrophotometer. The above dye derivative solution showed a maximum absorbance at 471 nm.

Synthesis Example 2

0.02 mole of N,N-dimethylaminolbenzaldehyde and 0.01 mole of raw material (c) (X is oxygen atom) were dissolved in 20 moles of methanol, and the resulting solution was refluxed for 8 hours. After the reaction was complete, the product was filtered and dried to obtain a bright orange colored solidified

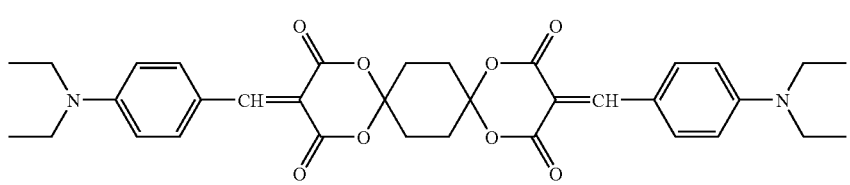
(1)

crystals. The yield was found to be about 80%. The chemical structure of this derivative is shown below.

(2)

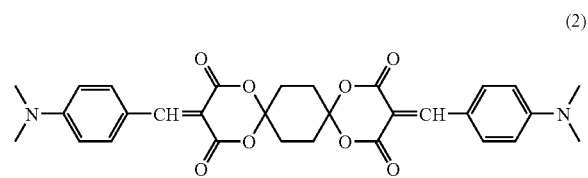

A sample of the above dye derivative (2) was dissolved in ethanol solution and the resulting solution was used for measuring the absorbance in a spectrophotometer. The above derivative solution showed a maximum absorbance at 466 nm.

Synthesis Example 3

0.02 mole of N,N-dibutylaminobenzaldehyde and 0.01 mole of raw material (c) (X is oxygen atom) were dissolved in 20 moles of methanol, and the resulting solution was refluxed for 8 hours. After the reaction was complete, the product was filtered and dried to obtain a bright orange colored solidified crystals. The yield was found to be about 80%. The chemical structure of this derivative is shown below.

A sample of the above dye derivative was dissolved in ethanol solution and the resulting solution was used for measuring the absorbance in a spectrophotometer. The above derivative solution showed a maximum absorbance at 464 nm.

FIG. 1 illustrates an UV/Visible/IR absorption spectrum of the dye derivative (1) of the present invention.

Figure 2:
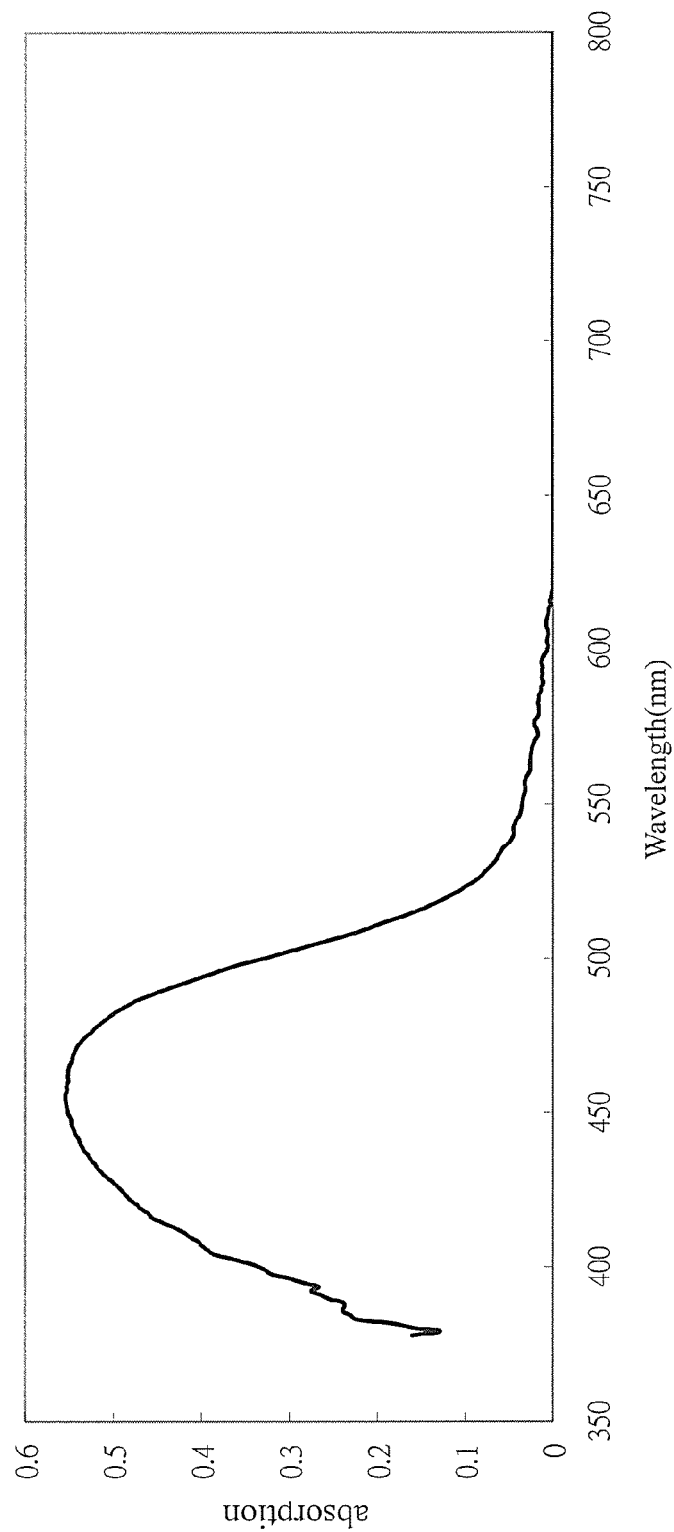
FIG. 2 illustrates an UV/Visible/IR absorption spectrum of the dye derivative (2) of the present invention.

FIG. 2 illustrates an UV/Visible/IR absorption spectrum of the dye derivative (1) of the present invention.

Figure 3:
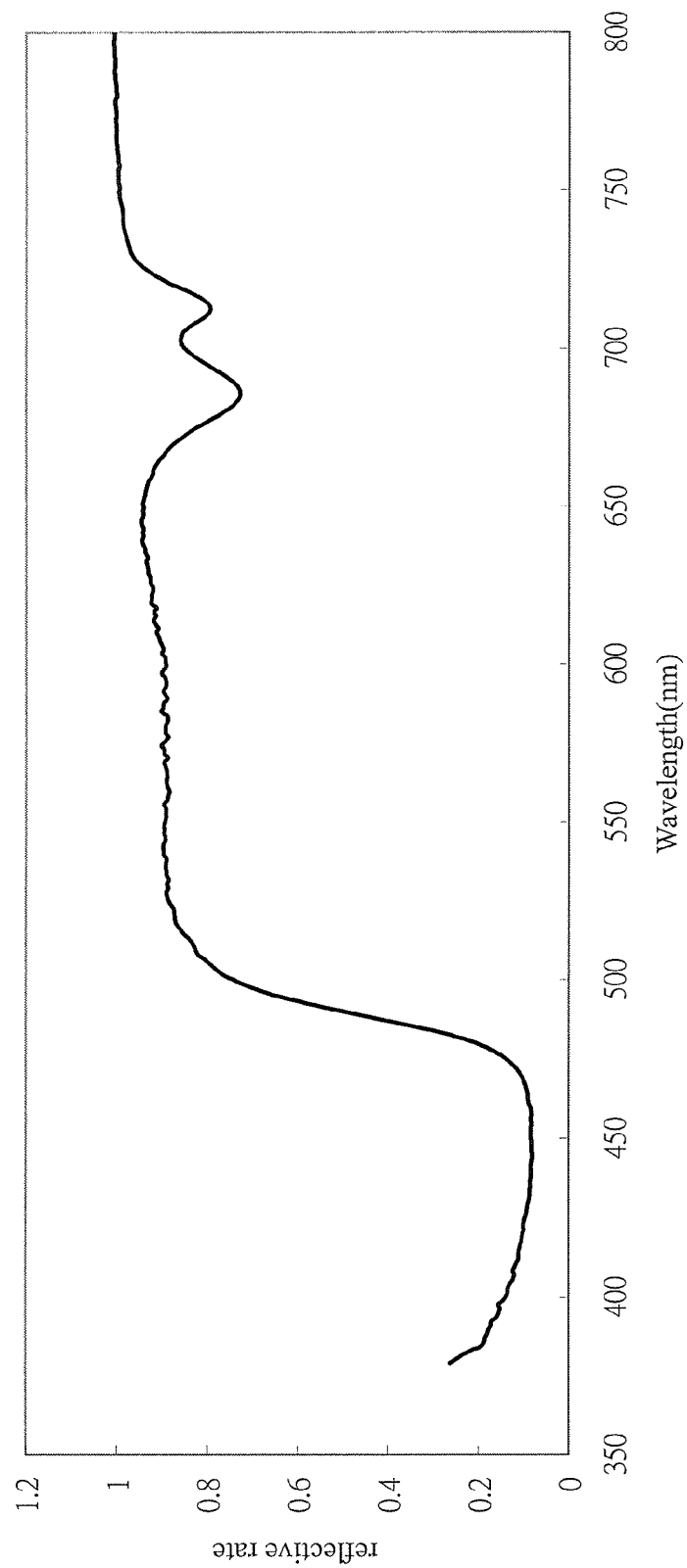
FIG. 3 illustrates a reflective spectrum for the disc having a HD-DVD-R recording layer of the dye derivative (1) of the present invention.

FIG. 3 illustrates a reflective spectrum for the disc having a HD-DVD-R recording layer of the dye derivative (1) of the present invention.

Figure 4:
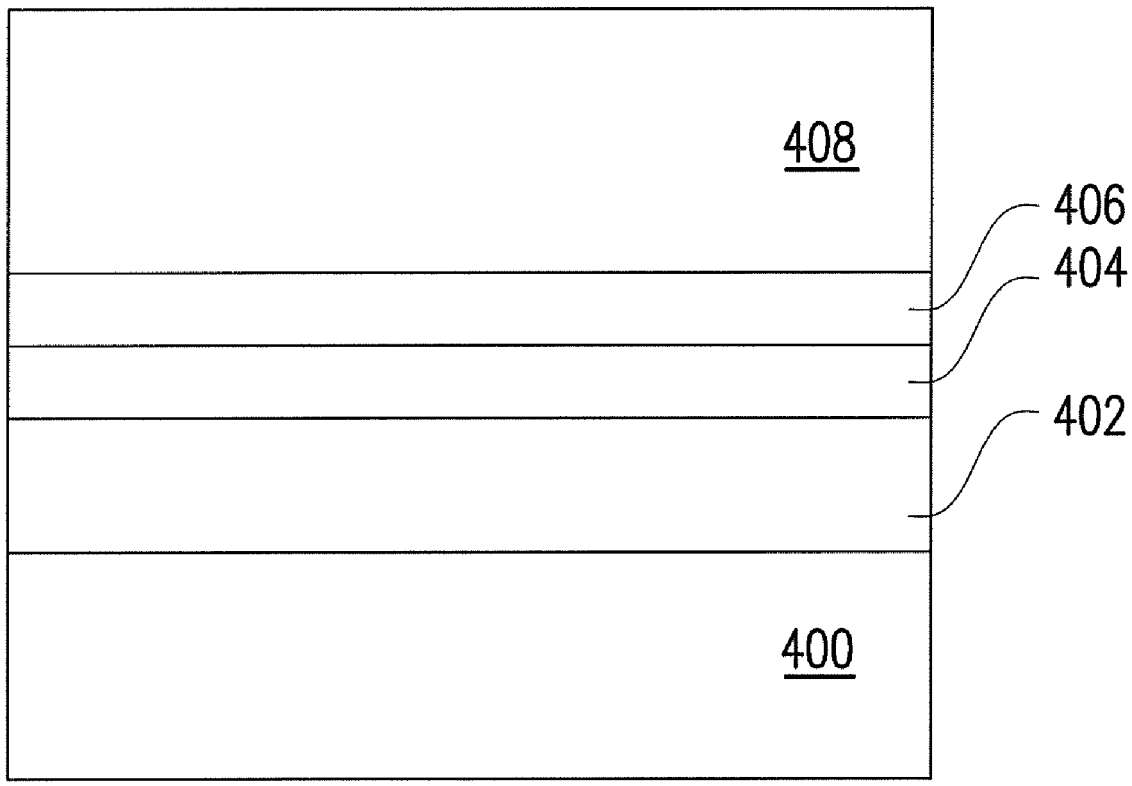
FIG. 4 illustrates cross sectional view of a high density optical recording medium according to an embodiment of the present invention.

Hereinafter, a structure of a blue-ray high density optical recording medium will be described with reference to FIG. 4 as follows. Referring to FIG. 4, the high density optical recording medium comprises a first substrate 400, a cover layer 408 and at least a recording layer 402, containing at least one of the derivatives of the dye (I) of the present invention described above, disposed between the first substrate 400 and the cover layer 408. Furthermore, a reflective layer 406 may be provided on the recording layer 402 and also, if necessary, a primer coating layer may be provided on the first substrate 400, a protective layer 404 may be provided on the recording layer 402 or the reflective layer 406, and a surface protective (3)

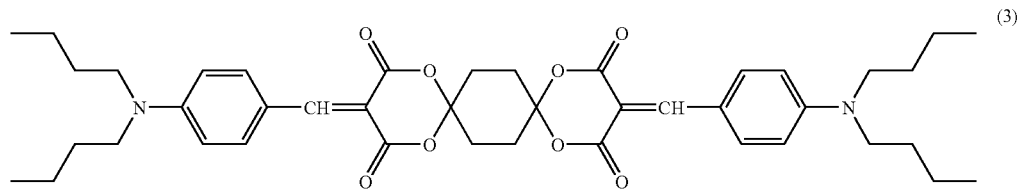

A sample of the above dye derivative (3) was dissolved in ethanol solution and the resulting solution was used for measuring the absorbance in a spectrophotometer. The above derivative solution showed a maximum absorbance at 466 nm.

Synthesis Example 4

0.02 mole of N,N-diheptylaminolbenzaldehyde and 0.01 mole of raw material (c) were dissolved in 20 moles of methanol, and the resulting solution was refluxed for 8 hours. After the reaction was complete, the product was filtered and dried to obtain a bright orange colored solidified crystals. The yield was found to be about 80%. The chemical structure of this derivative is shown below.

layer may be provided on the first substrate 400 at the opposite side to the recording layer 402.

According to an aspect of the present invention, the first substrate 400 and the cover layer 408 are preferably transparent to the laser beam. The material of the first substrate 400 and the cover layer 408 may be comprised of, for example but not limited to, glass or plastic materials. From various aspects, the plastic material is preferably used. The plastic material may be comprised of, for example but not limited to, polycarbonate (PC), polymethylmethacrylate (PMMA), polymer resins, glass, acryl resin, methacryl resin, vinyl acetate resin, vinyl chloride resin, nitro cellulose, polyethylene resin, polypropylene resin, polycarbonate resin, polyimide resin, epoxy resin, polysulfone resin and metallocene based cyclic olefin copolymer (mCOC). Among the plastic materials mentioned above, an injection molded polycarbon- (4)

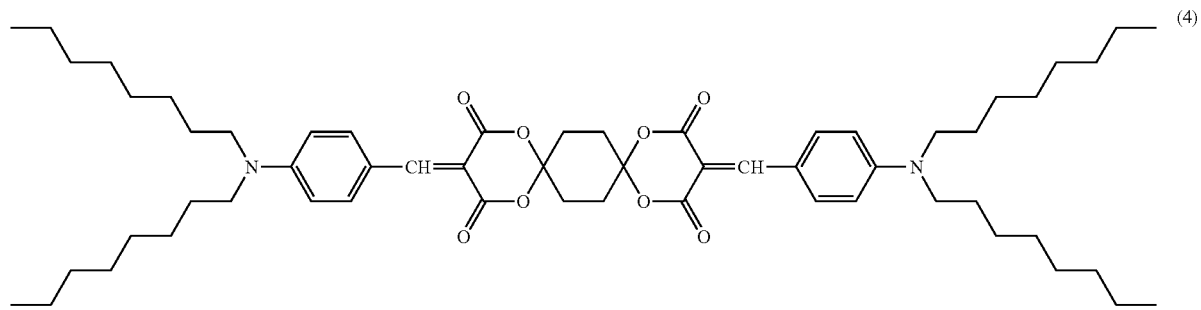

ate resin substrate may of particular interest from the viewpoint of the high productivity, low cost and moisture resistance. The thickness of the first substrate 400 may be between 0.5 mm to 1.3 mm, more preferably about 0.6 mm. The first substrate 400, for example, comprises lands, or pre-curved pits or grooves with a track pitch of less than 0.4 µm. The lands, or pre-curved pits or grooves in the first substrate 400 are used to provide a signal surface for the laser tracking of the pick-up head of the laser.

According to an aspect of the present invention, the recording layer 402 of the present invention containing the dye (I) is formed with a thickness in a range of about 10 Å to 500 µm, preferably in a range of about 5 nm to 200 nm. The recording layer 402 of the present invention may be formed by employing well known thin-film-forming methods such as a spin coating method, a roller press method, a vacuum vapor deposition method, a sputtering method, a doctor blade method, a casting method, inkjet printing method or a dipping method. However, the spin coating method is preferred from the viewpoint of the productivity and cost. A 1.5 Wt. % solution of the dye (I) of the present invention in 2,2,3,3-tetrafluoropropanol may be prepared and used for spin coating the thin film recording layer 402 over the first substrate 400. It should also be noted that other solvents such as alcohol, ketone, ether, chloroform or dichloromethane may also be used to make the dye solution for forming the thin film recording layer 402. Preferred examples of alcohol include 2,2,3,3-tetrafluoropropanol, methanol, ethanol and isopropanol. Preferred examples of ketone include acetone and dimethyl-ethyl ketone. Preferred examples of ether include ethyl ether and tetrahydrofuran.

According to an aspect of the present invention, the reflective layer 406 may be comprised of, for example but not limited to, metals such as gold, silver, copper, aluminum or platinum, titanium and alloys thereof, or equivalents thereof, which have high reflectance in the laser wavelength region to be employed. The thickness of the reflective layer 406 may be about 1 nm to 300 nm. The reflective layer 406 may be formed on the recording layer 402 using vacuum sputtering.

Finally, the cover layer 408 may be adhered over the reflective layer 406 to complete the fabrication of the blue-ray high density optical recording medium. The cover layer 408 may be adhered over the reflective layer 406 by spin coating, screen printing, thermal gluing or roller pressing.

According to an aspect of the present invention, the surface protective layer on the mirror surface side of the first substrate may be comprised of, for example but not limited to, an ultraviolet curable acryl resin or a silicon type hard coating agent. The surface protective is preferably provided with an antistatic ability for preventing dust or the like from adhering.

The recording layer 402 of the optical recording medium of the present invention may be formed on one side of the first substrate 400. According to an aspect of the present invention, multiple recording layers may be used for fabricating a multilayer stacked optical recording medium structure with a view of further increasing the storage capacity of the optical recording medium.

Recording on an optical recording medium thus obtained, may be conducted by irradiating a laser beam with a wavelength no longer than 530 nm, for example using a blue laser with a wavelength of 405 nm, to the recording layer. At the portion irradiated with the laser beam, a thermal deformation of the recording layer, such as decomposition, evaluation or melting may be formed due to absorption of the laser energy. Reproduction of the recorded information can be conducted by reading the difference in the reflectance between the portion having such a thermal deformation formed by a laser beam and the portion having no such a thermal deformation.

The recording and reproduction characteristics of the above optical recording medium was evaluated using a PULSTEC ODU-1000 instrument under the conditions including a blue laser beam with wavelength of 405 µm, objective lens numerical aperture (NA) of 0.65, CLV=6.61 m/s, reference layer (Ag)=150 nm; Type 1: High to low, reference (16%~32%); Type 2: Low to high, reference (14%~28%), and recording pattern 3T, 11T. The recording efficiency was found to be in a range of 7 to 12 mW and the reading efficiency was found to be 0.5 mW. As can be seen from the recording and reproduction characteristics results shown in table 1 below that the optical recording medium incorporating the recording layer including the dye derivatives (1-4) of the present invention maintained recording and reading efficiencies below 10 mW and the CNR of both recording pattern 3T, 11T maintained a high level, for example between 40-50 dB. Thus, the organic dye derivatives (1-4) of the present invention described above can be practically used as an optical recording material for a recording layer for, for example, a blue-ray HD-DVD-R.

TABLE 1

| DYE | Max Abs. (MeOH)/nm | n + ik (405 nm) | Writing Power | $I11_L$ | $I11_H$ | 3TCNR | 11TCNR |
|---|---|---|---|---|---|---|---|
| Dye (1) | 471 nm | 0.877 + 0.642i | 10 mW | 110 mV | 235 mV | 48 dB | 50 dB |
| Dye (2) | 466 nm | 0.900 + 0.502i | 10 mW | 120 mV | 220 mV | 43 dB | 42 dB |
| Dye (3) | 466 nm | 0.965 + 0.373i | 10 mW | 223 mV | 279 mV | 50 dB | 48 dB |
| Dye (4) | 464 nm | 1.008 + 0.416i | 12 mW | 153 mV | 352 mV | 45 dB | 48 dB |

Wherein n represents the real of the refraction for the dye film, k represents the imaginary of the refraction for the dye film, $I_{11L}$ represents the reflectance for the space of 11T after disk writing, $I_{11H}$ represents the reflectance for the mark of 11T after disk writing, and CNR represents carrier-to-noise ratio.

Since the recording layer incorporated with the dye (I) of the present invention shows absorption in the range of 300 to 600 nm and is excellent in the light fastness and thermal stability, it is possible employ a short wavelength laser with a wavelength no longer than 530 nm, preferably a blue laser with a wavelength of about 405 nm, to record high density information thereon and reproduce the high density information recorded thereon. Thus, the recording layer incorporated with the dye (I) of the present invention makes fabrication of a high density optical recording medium possible.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A method for synthesizing a dye having a following general chemical structural formula:

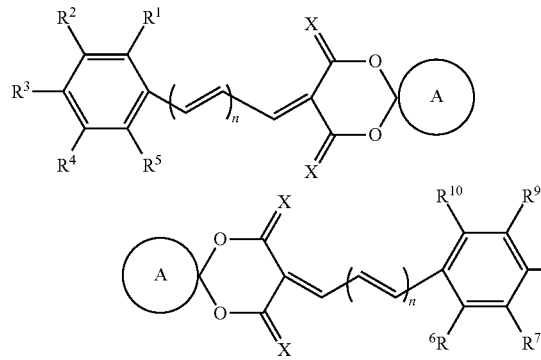

wherein n is an integer of 0 or 1, X represents oxygen atom or $C(CN)_2$, A represents substituted or non-substituted cyclic alkyl group and $R_1, R_2, R_3, R_4, R_5, R_6, R_7, R_8, R_9, R_{10}$ represent hydrogen atom, halogen atom, alkyl group with carbon number 1-18 ($C_{1-18}$), alkoxy group with carbon number 1-18 ($C_{1-18}$), carboxyl group with carbon number 1-18 ($C_{1-18}$), amino group, substituted amino group, alkyl ester group with carbon number 1-18 ($C_{1-18}$), carboxyl group with carbon number 1-18 ($C_{1-18}$), benzene including amino group or carboxyl group, nitro group, adamantyl carbonyl group, adamantyl group, alkenyl group, alkynyl group, amino group, azo group, aryl group, aryloxy group, arylcarbonyl group, aryloxycarbonyl group, arylcarbonyloxy group, aryloxycarbonyloxy group, alkylcarbonyl group, alkylcarbonyloxy group, alkoxycarbonyloxy group, alkoxycarbonyl group, carbamoyl group, cyanate group, cyano group, formyl group, formyloxy group, heterocyclic group, isothiocyanate group, isocyano group, isocyanate group, nitroso group, perfluoroalkyl group, perfluoroalkoxy group, sulfinyl group, sulfonyl group, silyl group, or thiocyanate group, and wherein the method comprises a following chemical reaction:

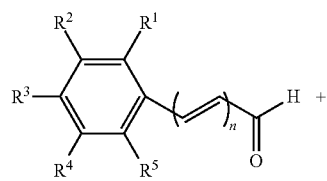

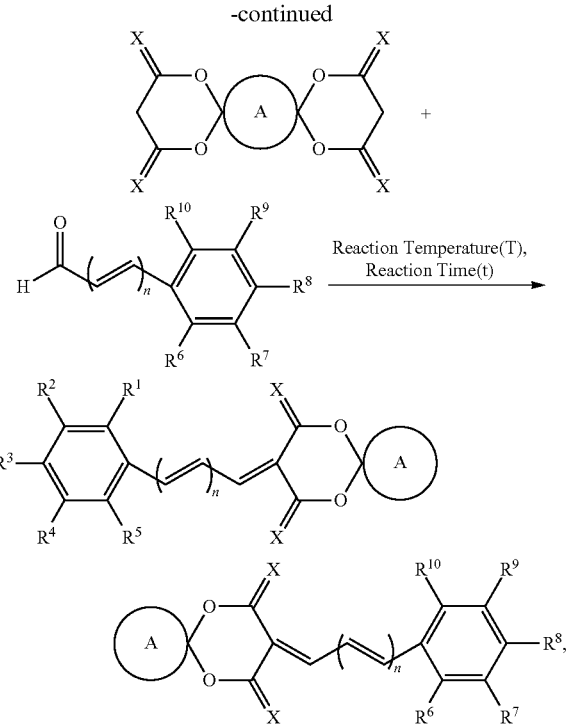

wherein a reaction temperature (T) is between −15° C. to 150° C., and a reaction time (t) is more than one minute.

2. A preparation method for a dye having a following general chemical structural formula:

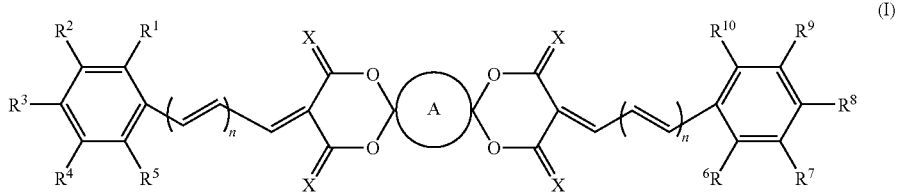

wherein n is an integer of 0 or 1, X represents oxygen atom or $C(CN)_2$, A represents substituted or non-substituted cyclic alkyl group and $R_1, R_2, R_3, R_4, R_5, R_6, R_7, R_8, R_9, R_{10}$ represent hydrogen atom, halogen atom, alkyl group with carbon number 1-18 ($C_{1-18}$), alkoxy group with carbon number 1-18 ($C_{1-18}$), carboxyl group with carbon number 1-18 ($C_{1-18}$), amino group, substituted amino group, alkyl ester group with carbon number 1-18 ($C_{1-18}$), carboxyl group with carbon number 1-18 ($C_{1-18}$), benzene including amino group or carboxyl group, nitro group, adamantyl carbonyl group, adamantyl group, alkenyl group, alkynyl group, amino group, azo group, aryl group, aryloxy group, arylcarbonyl group, aryloxycarbonyl group, arylcarbonyloxy group, aryloxycarbonyloxy group, alkylcarbonyl group, alkylcarbonyloxy group, alkoxycarbonyloxy group, alkoxycarbonyl group, carbamoyl group, cyanate group, cyano group, formyl group, formyloxy group, heterocyclic group, isothiocyanate group, isocyano group, isocyanate group, nitroso group, perfluoroalkyl group, perfluoroalkoxy group, sulfinyl group, sulfonyl group, silyl group, or thiocyanate group, wherein the preparation method comprises following steps:

dissolving a starting material (c) having a following formula:

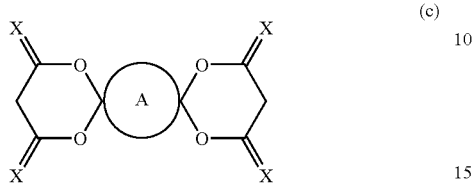

and N,N-dialkylaminolbenzaldehyde in methanol to form a mixture solution, wherein for the starting material (c), A represents substituted or non-substituted cyclic alkyl group, X represents oxygen atom or $C(CN)_2$;

refluxing the mixture solution until the reaction is completed; and filtering the mixture solution to obtain the dye.

3. A fabrication method of a recording layer comprising the dye as recited in claim 1, comprising:

dissolving the dye in a solvent to form a dye solution, wherein the dye solution includes at least 1.5 percentage by weight of the dye in a total weight of the dye solution; and applying the dye solution to form the recording layer between a substrate and a cover by a spin coating method, a roller press method, inkjet printing method or a dipping method.

* * * * *